(12) United States Patent
Arizti et al.

(10) Patent No.: US 11,463,660 B2
(45) Date of Patent: Oct. 4, 2022

(54) MONITORING SYSTEM FOR PROVIDING BOTH VISUAL AND NON-VISUAL DATA

(71) Applicant: The Procter & Gamble Company, Cincinnati, OH (US)

(72) Inventors: Blanca Arizti, Schmitten (DE); Mark Reidy, Geveva (SE); Omer Sher, Geneva (SE); Jennifer Mary Harrington, Cambridge, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 86 days.

(21) Appl. No.: 16/402,514

(22) Filed: May 3, 2019

(65) Prior Publication Data
US 2020/0177848 A1     Jun. 4, 2020

Related U.S. Application Data

(60) Provisional application No. 62/773,401, filed on Nov. 30, 2018.

(51) Int. Cl.
| | |
|---|---|
| *H04N 7/18* | (2006.01) |
| *G01N 27/12* | (2006.01) |
| *G01P 15/08* | (2006.01) |
| *H04N 5/247* | (2006.01) |
| *G01K 1/14* | (2021.01) |
| *H04N 5/225* | (2006.01) |

(52) U.S. Cl.
CPC ............... *H04N 7/183* (2013.01); *G01K 1/14* (2013.01); *G01N 27/121* (2013.01); *G01P 15/08* (2013.01); *H04N 5/2253* (2013.01); *H04N 5/247* (2013.01)

(58) Field of Classification Search
None
See application file for complete search history.

(56) References Cited

U.S. PATENT DOCUMENTS

| | | |
|---|---|---|
| 3,848,594 A | 11/1974 | Buell |
| 3,860,003 A | 1/1975 | Buell |
| 3,911,173 A | 10/1975 | Sprague |
| 4,022,210 A | 5/1977 | Glassman |
| 4,265,245 A | 5/1981 | Glassman |
| 4,286,331 A | 8/1981 | Anderson |
| 4,515,595 A | 5/1985 | Kievit et al. |
| 4,554,662 A | 11/1985 | Suzuki |
| 4,573,986 A | 3/1986 | Minetola et al. |
| 4,662,875 A | 5/1987 | Hirotsu et al. |
| 4,681,793 A | 7/1987 | Linman et al. |
| 4,695,278 A | 9/1987 | Lawson |

(Continued)

FOREIGN PATENT DOCUMENTS

| | | |
|---|---|---|
| CN | 103780814 A | 5/2014 |
| CN | 203734736 U | 7/2014 |

(Continued)

OTHER PUBLICATIONS

PCT International Search Report, dated Aug. 16, 2019, 14 pages.

(Continued)

*Primary Examiner* — Christopher Braniff
(74) *Attorney, Agent, or Firm* — Amanda Herman Berghauer; Brian M. Bolam; Andrew J. Hagerty

(57) ABSTRACT

Monitoring systems are provided that include both visual and non-visual data to monitor the well-being of individuals, such as infants and patients.

11 Claims, 7 Drawing Sheets

(56) References Cited

U.S. PATENT DOCUMENTS

| | | | |
|---|---|---|---|
| 4,699,622 A | 10/1987 | Toussant et al. |
| 4,710,189 A | 12/1987 | Lash |
| 4,785,996 A | 11/1988 | Ziecker et al. |
| 4,795,454 A | 1/1989 | Dragoo |
| 4,808,178 A | 2/1989 | Aziz et al. |
| 4,842,666 A | 6/1989 | Werenicz |
| 4,846,815 A | 7/1989 | Scripps |
| 4,894,060 A | 1/1990 | Nestegard |
| 4,908,803 A | 3/1990 | Aziz et al. |
| 4,940,464 A | 7/1990 | Van Gompel et al. |
| 4,946,527 A | 8/1990 | Battrell |
| 4,963,140 A | 10/1990 | Robertson et al. |
| 4,977,906 A | 12/1990 | Di Scipio |
| 5,036,859 A | 8/1991 | Brown |
| 5,137,537 A | 8/1992 | Herron et al. |
| 5,151,092 A | 9/1992 | Buell et al. |
| 5,221,274 A | 6/1993 | Buell et al. |
| 5,242,436 A | 9/1993 | Weil et al. |
| 5,264,830 A | 11/1993 | Kline et al. |
| 5,354,289 A | 10/1994 | Mitchell et al. |
| 5,415,649 A | 5/1995 | Watanabe |
| 5,433,715 A | 7/1995 | Tanzer et al. |
| 5,469,145 A | 11/1995 | Johnson |
| 5,499,978 A | 3/1996 | Buell et al. |
| 5,507,736 A | 4/1996 | Clear et al. |
| 5,554,145 A | 9/1996 | Roe et al. |
| 5,569,234 A | 10/1996 | Buell et al. |
| 5,571,096 A | 11/1996 | Dobrin et al. |
| 5,580,411 A | 12/1996 | Nease et al. |
| 5,590,152 A | 12/1996 | Nakajima et al. |
| 5,607,414 A | 3/1997 | Richards et al. |
| 5,628,097 A | 5/1997 | Benson et al. |
| 5,700,254 A | 12/1997 | McDowall et al. |
| 5,709,222 A | 1/1998 | Davallou |
| 5,714,156 A | 2/1998 | Schmidt et al. |
| 5,817,087 A | 10/1998 | Takabayashi |
| 5,838,240 A | 11/1998 | Johnson |
| 5,865,823 A | 2/1999 | Curro |
| 5,902,222 A | 5/1999 | Wessman |
| 5,938,648 A | 8/1999 | LaVon et al. |
| 5,959,535 A | 9/1999 | Remsburg |
| 6,004,306 A | 12/1999 | Robles et al. |
| 6,160,198 A | 3/2000 | Roe et al. |
| 6,093,869 A | 7/2000 | Roe et al. |
| 6,121,509 A | 9/2000 | Ashraf et al. |
| 6,179,820 B1 | 1/2001 | Fernfors |
| 6,203,496 B1 | 3/2001 | Gael et al. |
| 6,246,330 B1 | 6/2001 | Nielsen |
| 6,264,643 B1 | 7/2001 | Toyoda |
| 6,306,122 B1 | 10/2001 | Narawa |
| 6,372,951 B1 | 4/2002 | Ovanesyan et al. |
| 6,384,296 B1 | 5/2002 | Roe et al. |
| 6,432,098 B1 | 8/2002 | Kline et al. |
| 6,501,002 B1 | 12/2002 | Roe et al. |
| 6,534,149 B1 | 3/2003 | Daley et al. |
| 6,583,722 B2 | 6/2003 | Jeutter |
| 6,603,403 B2 | 8/2003 | Jeutter et al. |
| 6,609,068 B2 | 8/2003 | Cranley |
| 6,617,488 B1 | 9/2003 | Springer et al. |
| 6,632,504 B1 | 10/2003 | Gillespie et al. |
| 6,645,190 B1 | 11/2003 | Olson et al. |
| 6,645,569 B2 | 11/2003 | Cramer et al. |
| 6,761,711 B1 | 7/2004 | Fletcher et al. |
| 6,817,994 B2 | 11/2004 | Popp et al. |
| 6,840,928 B2 | 1/2005 | Datta et al. |
| 6,849,067 B2 | 2/2005 | Fletcher et al. |
| 6,863,933 B2 | 3/2005 | Cramer et al. |
| 6,893,426 B1 | 5/2005 | Popp et al. |
| 6,946,585 B2 | 9/2005 | London Brown |
| 6,953,452 B2 | 10/2005 | Popp et al. |
| 6,969,377 B2 | 11/2005 | Koele et al. |
| 7,002,054 B2 | 2/2006 | Allen et al. |
| 7,049,969 B2 | 5/2006 | Tamai |
| 7,112,621 B2 | 9/2006 | Rohrbaugh et al. |
| 7,145,053 B1 * | 12/2006 | Emenike ............... A61F 13/42 604/361 |
| 7,156,833 B2 | 1/2007 | Courure-Dorschner et al. |
| 7,174,774 B2 | 2/2007 | Pawar |
| 7,201,744 B2 | 4/2007 | Van Gompel et al. |
| 7,241,627 B2 | 7/2007 | Wilhelm et al. |
| 7,250,547 B1 | 7/2007 | Hofmeister et al. |
| 7,295,125 B2 | 11/2007 | Gabriel |
| 7,355,090 B2 | 4/2008 | Alex et al. |
| 7,394,391 B2 | 7/2008 | Long |
| 7,410,479 B2 | 8/2008 | Hoshino |
| 7,449,614 B2 | 11/2008 | Alex |
| 7,477,156 B2 | 1/2009 | Long et al. |
| 7,489,252 B2 | 2/2009 | Long et al. |
| 7,497,851 B2 | 3/2009 | Koele et al. |
| 7,498,478 B2 | 3/2009 | Long et al. |
| 7,504,550 B2 | 3/2009 | Tippey et al. |
| 7,524,195 B2 | 4/2009 | Alex et al. |
| 7,527,615 B2 | 5/2009 | Roe |
| 7,537,832 B2 | 5/2009 | Carlucci et al. |
| 7,569,039 B2 | 8/2009 | Matsuda |
| 7,595,734 B2 | 9/2009 | Long et al. |
| 7,642,396 B2 | 1/2010 | Alex et al. |
| 7,649,125 B2 | 1/2010 | Ales et al. |
| 7,659,815 B2 | 2/2010 | Cohen et al. |
| 7,667,806 B2 | 2/2010 | Ales et al. |
| 7,682,349 B2 | 3/2010 | Popp et al. |
| 7,700,820 B2 | 4/2010 | Tippey et al. |
| 7,700,821 B2 | 4/2010 | Alex et al. |
| 7,737,322 B2 | 6/2010 | Alex et al. |
| 7,744,579 B2 | 6/2010 | Langdon |
| 7,753,691 B2 | 7/2010 | Ales et al. |
| 7,760,101 B2 | 7/2010 | Alex et al. |
| 7,786,341 B2 | 8/2010 | Schneider et al. |
| 7,789,869 B2 | 9/2010 | Berland et al. |
| 7,803,319 B2 | 9/2010 | Yang et al. |
| 7,812,731 B2 | 10/2010 | Benza et al. |
| 7,834,235 B2 | 11/2010 | Long et al. |
| 7,835,925 B2 | 11/2010 | Roe et al. |
| 7,846,383 B2 | 12/2010 | Song |
| 7,850,470 B2 | 12/2010 | Ales et al. |
| 7,855,653 B2 | 12/2010 | Rondoni et al. |
| 7,862,550 B2 | 1/2011 | Koele et al. |
| 7,879,392 B2 | 2/2011 | Wenzel et al. |
| 7,956,754 B2 | 4/2011 | Long |
| 7,946,869 B2 | 5/2011 | Ales et al. |
| 7,973,210 B2 | 7/2011 | Long et al. |
| 7,977,529 B2 | 7/2011 | Berman et al. |
| 8,007,485 B2 | 8/2011 | Popp et al. |
| 8,044,258 B2 | 10/2011 | Hietpas |
| 8,053,624 B2 | 11/2011 | Nhan et al. |
| 8,053,625 B2 | 11/2011 | Nhan et al. |
| 8,057,454 B2 | 11/2011 | Long et al. |
| 8,058,194 B2 | 11/2011 | Nhan et al. |
| 8,101,813 B2 | 1/2012 | Ales et al. |
| 8,111,165 B2 | 2/2012 | Ortega et al. |
| 8,115,643 B2 | 2/2012 | Wada et al. |
| 8,172,982 B2 | 5/2012 | Ales et al. |
| 8,173,380 B2 | 5/2012 | Yang et al. |
| 8,183,876 B2 | 5/2012 | Wada et al. |
| 8,196,270 B2 | 6/2012 | Mandzsu |
| 8,196,809 B2 | 6/2012 | Thorstensson |
| 8,207,394 B2 | 6/2012 | Feldkamp et al. |
| 8,215,973 B2 | 7/2012 | Ales et al. |
| 8,222,476 B2 | 7/2012 | Song et al. |
| 8,237,572 B2 | 8/2012 | Clement et al. |
| 8,248,249 B2 | 8/2012 | Clement et al. |
| 8,264,362 B2 | 9/2012 | Ales et al. |
| 8,274,393 B2 | 9/2012 | Ales et al. |
| 8,299,317 B2 | 10/2012 | Tippey et al. |
| 8,304,598 B2 | 11/2012 | Masbacher et al. |
| 8,314,284 B1 | 11/2012 | Novello |
| 8,334,226 B2 | 12/2012 | Nhan et al. |
| 8,334,425 B2 | 12/2012 | Ales et al. |
| 8,338,659 B2 | 12/2012 | Collins et al. |
| 8,350,694 B1 | 1/2013 | Trundle |
| 8,361,048 B2 | 1/2013 | Kuen et al. |
| 8,372,052 B2 | 2/2013 | Popp et al. |
| 8,372,242 B2 | 2/2013 | Ales et al. |

(56) References Cited

U.S. PATENT DOCUMENTS

| | | |
|---|---|---|
| 8,372,766 B2 | 2/2013 | Nhan et al. |
| 8,378,167 B2 | 2/2013 | Allen et al. |
| 8,381,536 B2 | 2/2013 | Nhan et al. |
| 8,384,378 B2 | 2/2013 | Feldkamp et al. |
| 8,395,014 B2 | 3/2013 | Helmer et al. |
| 8,416,088 B2 | 4/2013 | Ortega et al. |
| 8,431,766 B1 | 4/2013 | Lonero |
| 8,440,877 B2 | 5/2013 | Collins et al. |
| 8,452,388 B2 | 5/2013 | Feldkamp et al. |
| 8,471,715 B2 | 6/2013 | Solazzo et al. |
| 8,507,746 B2 | 8/2013 | Ong et al. |
| 8,518,009 B2 | 8/2013 | Saito |
| 8,518,010 B2 | 8/2013 | Kuwano |
| 8,546,639 B2 | 10/2013 | Wada et al. |
| 8,563,801 B2 | 10/2013 | Berland et al. |
| 8,570,175 B2 | 10/2013 | Rahimi |
| 8,579,876 B2 | 11/2013 | Popp et al. |
| 8,604,268 B2 | 12/2013 | Cohen et al. |
| 8,623,292 B2 | 1/2014 | Song et al. |
| 8,628,506 B2 | 1/2014 | Alex et al. |
| 8,882,731 B2 | 1/2014 | Suzuki et al. |
| 8,642,832 B2 | 2/2014 | Ales et al. |
| 8,697,933 B2 | 4/2014 | Alex et al. |
| 8,697,934 B2 | 4/2014 | Nhan et al. |
| 8,697,935 B2 | 4/2014 | Daanen |
| 8,698,641 B2 | 4/2014 | Abrham et al. |
| 8,742,198 B2 | 6/2014 | Wei et al. |
| 8,747,379 B2 | 6/2014 | Fletcher et al. |
| 8,773,117 B2 | 7/2014 | Feldkamp et al. |
| 8,779,785 B2 | 7/2014 | Wada et al. |
| 8,785,716 B2 | 7/2014 | Schäfer et al. |
| 8,816,149 B2 | 8/2014 | Richardson et al. |
| 8,866,052 B2 | 10/2014 | Nhan et al. |
| 8,866,624 B2 | 10/2014 | Ales et al. |
| 8,884,769 B2 | 11/2014 | Novak |
| 8,889,944 B2 | 11/2014 | Abraham et al. |
| 8,920,731 B2 | 12/2014 | Nhan et al. |
| 8,933,291 B2 | 1/2015 | Wei et al. |
| 8,933,292 B2 | 1/2015 | Abraham et al. |
| 8,962,909 B2 | 2/2015 | Groosman et al. |
| 8,975,465 B2 | 3/2015 | Hong et al. |
| 8,978,452 B2 | 3/2015 | Johnson et al. |
| 8,988,231 B2 | 3/2015 | Chen |
| 9,018,434 B2 | 4/2015 | Ruman |
| 9,018,435 B2 | 4/2015 | Kawashima |
| 9,034,593 B2 | 5/2015 | Martin et al. |
| 9,070,060 B2 | 6/2015 | Forster |
| 9,072,632 B2 | 7/2015 | Lavon |
| 9,072,634 B2 | 7/2015 | Hundorf et al. |
| 9,168,185 B2 | 10/2015 | Berland et al. |
| 9,211,218 B2 | 12/2015 | Rinnert et al. |
| 9,295,593 B2 | 3/2016 | Van Malderen |
| 9,301,884 B2 | 4/2016 | Shah et al. |
| 9,314,381 B2 | 4/2016 | Curran et al. |
| 9,317,913 B2 | 4/2016 | Carney |
| 9,380,977 B2 | 7/2016 | Abir |
| 9,402,771 B2 | 8/2016 | Carney et al. |
| 9,421,137 B2 | 8/2016 | LaVon et al. |
| 9,545,342 B2 | 1/2017 | Cretu-petra |
| 9,585,795 B2 | 3/2017 | Boase et al. |
| 10,702,705 B2* | 7/2020 | Malchano ......... A61N 1/36025 |
| 2002/0021220 A1 | 2/2002 | Dreyer |
| 2002/0070864 A1 | 6/2002 | Jeutter et al. |
| 2003/0105190 A1 | 6/2003 | Diehl et al. |
| 2003/0148684 A1 | 8/2003 | Cramer et al. |
| 2003/0208133 A1 | 11/2003 | Mault |
| 2004/0064114 A1 | 4/2004 | David |
| 2004/0106202 A1 | 6/2004 | Zainiev et al. |
| 2004/0127867 A1 | 7/2004 | Odorzynski et al. |
| 2004/0127878 A1 | 7/2004 | Olson |
| 2004/0220538 A1* | 11/2004 | Panopoulos ............ A61F 13/42 |
| | | 604/361 |
| 2004/0236302 A1 | 11/2004 | Wilhelm et al. |
| 2004/0254549 A1 | 12/2004 | Olson et al. |
| 2005/0008839 A1 | 1/2005 | Cramer et al. |
| 2005/0033250 A1 | 2/2005 | Collette |
| 2005/0065487 A1 | 3/2005 | Graef et al. |
| 2005/0099294 A1 | 5/2005 | Bogner |
| 2005/0107763 A1 | 5/2005 | Matsuda |
| 2005/0124947 A1 | 6/2005 | Femfors |
| 2005/0137542 A1 | 6/2005 | Underhill et al. |
| 2005/0156744 A1 | 7/2005 | Pires |
| 2005/0195085 A1 | 9/2005 | Cretu-Petra |
| 2006/0058745 A1 | 3/2006 | Pires |
| 2006/0061477 A1 | 3/2006 | Yeh |
| 2006/0069362 A1 | 3/2006 | Odorzynski |
| 2006/0195068 A1 | 8/2006 | Lawando |
| 2006/0222675 A1 | 10/2006 | Sahnis et al. |
| 2006/0224135 A1 | 10/2006 | Beck |
| 2006/0229578 A1 | 10/2006 | Roe |
| 2006/0264861 A1 | 11/2006 | Lavon |
| 2007/0044805 A1 | 3/2007 | Wedler |
| 2007/0046482 A1* | 3/2007 | Chan ...................... A61F 13/42 |
| | | 340/604 |
| 2007/0055210 A1 | 3/2007 | Kao |
| 2007/0100666 A1 | 5/2007 | Stivoric |
| 2007/0142797 A1 | 6/2007 | Long et al. |
| 2007/0156106 A1 | 7/2007 | Klofta |
| 2007/0185467 A1 | 8/2007 | Klofta et al. |
| 2007/0233027 A1 | 10/2007 | Roe et al. |
| 2007/0252710 A1 | 11/2007 | Long |
| 2007/0252711 A1 | 11/2007 | Long et al. |
| 2007/0252713 A1 | 11/2007 | Rondoni et al. |
| 2007/0255241 A1 | 11/2007 | Weber et al. |
| 2007/0255242 A1 | 11/2007 | Ales et al. |
| 2007/0282286 A1 | 12/2007 | Collins |
| 2007/0287975 A1 | 12/2007 | Fujimoto |
| 2008/0021423 A1 | 1/2008 | Klofta |
| 2008/0021428 A1 | 1/2008 | Klofta et al. |
| 2008/0052030 A1 | 2/2008 | Olson et al. |
| 2008/0054408 A1 | 3/2008 | Tippey et al. |
| 2008/0057693 A1 | 3/2008 | Tippey et al. |
| 2008/0058740 A1 | 3/2008 | Sullivan et al. |
| 2008/0058741 A1 | 3/2008 | Long et al. |
| 2008/0058742 A1 | 3/2008 | Ales |
| 2008/0074274 A1 | 3/2008 | Hu |
| 2008/0082063 A1 | 4/2008 | Ales |
| 2008/0132859 A1 | 6/2008 | Pires |
| 2008/0147031 A1 | 6/2008 | Long et al. |
| 2008/0208155 A1 | 8/2008 | Lavon |
| 2008/0218334 A1 | 9/2008 | Pitchers |
| 2008/0234644 A1 | 9/2008 | Hansson et al. |
| 2008/0266117 A1 | 10/2008 | Song et al. |
| 2008/0266122 A1 | 10/2008 | Ales et al. |
| 2008/0266123 A1 | 10/2008 | Ales |
| 2008/0269702 A1* | 10/2008 | Ales ...................... A61F 13/42 |
| | | 604/361 |
| 2008/0269707 A1 | 10/2008 | Song |
| 2008/0300559 A1 | 12/2008 | Gustafson |
| 2008/0312622 A1 | 12/2008 | Hundorf et al. |
| 2009/0058072 A1 | 3/2009 | Weber et al. |
| 2009/0062756 A1 | 3/2009 | Long et al. |
| 2009/0124990 A1 | 5/2009 | Feldkamp et al. |
| 2009/0155753 A1 | 6/2009 | Ales et al. |
| 2009/0198202 A1 | 8/2009 | Nedestam |
| 2009/0275908 A1 | 11/2009 | Song |
| 2009/0326409 A1 | 12/2009 | Cohen et al. |
| 2009/0326504 A1 | 12/2009 | Kaneda |
| 2010/0013778 A1 | 1/2010 | Liu |
| 2010/0030173 A1 | 2/2010 | Song et al. |
| 2010/0125949 A1 | 5/2010 | Stebbirig |
| 2010/0145294 A1 | 6/2010 | Song et al. |
| 2010/0152688 A1 | 6/2010 | Handwerker et al. |
| 2010/0159599 A1 | 6/2010 | Song et al. |
| 2010/0159611 A1 | 6/2010 | Song et al. |
| 2010/0160882 A1 | 6/2010 | Lowe |
| 2010/0164733 A1 | 7/2010 | Ales et al. |
| 2010/0168694 A1 | 7/2010 | Gakhar et al. |
| 2010/0168702 A1 | 7/2010 | Ales et al. |
| 2010/0241094 A1 | 9/2010 | Sherron |
| 2010/0277324 A1 | 11/2010 | Yeh |
| 2011/0004175 A1 | 1/2011 | Veith |
| 2011/0251038 A1 | 10/2011 | Lavon |
| 2011/0298597 A1 | 12/2011 | Kaihori |

(56) References Cited

U.S. PATENT DOCUMENTS

| | | |
|---|---|---|
| 2012/0310191 A1 | 2/2012 | LaVon et al. |
| 2012/0061016 A1 | 3/2012 | LaVon |
| 2012/0109087 A1 | 5/2012 | Abraham |
| 2012/0116337 A1 | 5/2012 | Ales |
| 2012/0116343 A1 | 5/2012 | Yoshioka |
| 2012/0130330 A1 | 5/2012 | Wilson et al. |
| 2012/0157947 A1 | 6/2012 | Nhan |
| 2012/0161960 A1 | 6/2012 | Cheng |
| 2012/0172824 A1 | 7/2012 | Khaknazarov |
| 2012/0190956 A1 | 7/2012 | Connolly |
| 2012/0206265 A1 | 8/2012 | Solazzo |
| 2012/0225200 A1 | 9/2012 | Mandzsu |
| 2012/0245541 A1 | 9/2012 | Suzuki |
| 2012/0245542 A1 | 9/2012 | Suzuki et al. |
| 2012/0256750 A1 | 10/2012 | Novak |
| 2012/0282681 A1 | 11/2012 | Teixeira et al. |
| 2012/0299721 A1 | 11/2012 | Jones |
| 2012/0310190 A1 | 12/2012 | LaVon et al. |
| 2012/0310192 A1 | 12/2012 | Suzuki et al. |
| 2012/0323194 A1 | 12/2012 | Suzuki et al. |
| 2013/0012896 A1 | 1/2013 | Suzuki et al. |
| 2013/0018340 A1 | 1/2013 | Abraham et al. |
| 2013/0023786 A1 | 1/2013 | Mani et al. |
| 2013/0041334 A1 | 2/2013 | Prioleau |
| 2013/0076509 A1 | 3/2013 | Ahn |
| 2013/0110061 A1 | 5/2013 | Abraham et al. |
| 2013/0110063 A1 | 5/2013 | Abraham |
| 2013/0110075 A1 | 5/2013 | Mukai |
| 2013/0131618 A1 | 5/2013 | Abraham et al. |
| 2013/0151186 A1 | 6/2013 | Feldkamp |
| 2013/0161380 A1 | 6/2013 | Joyce et al. |
| 2013/0162402 A1 | 6/2013 | Amann et al. |
| 2013/0162403 A1 | 6/2013 | Stiemer et al. |
| 2013/0162404 A1 | 6/2013 | Stiemer et al. |
| 2013/0165809 A1 | 6/2013 | Abir |
| 2013/0211363 A1 | 8/2013 | LaVon et al. |
| 2013/0261409 A1 | 10/2013 | Pathak |
| 2013/0303867 A1 | 11/2013 | Elfstrom et al. |
| 2013/0307570 A1 | 11/2013 | Bosae et al. |
| 2013/0310796 A1 | 11/2013 | Zink |
| 2013/0321007 A1 | 12/2013 | Elfstrom et al. |
| 2013/0324955 A1 | 12/2013 | Wong et al. |
| 2013/0338623 A1 | 12/2013 | Kinoshita |
| 2014/0005020 A1 | 1/2014 | LaVon et al. |
| 2014/0005622 A1 | 1/2014 | Wirtz et al. |
| 2014/0014716 A1 | 1/2014 | Joyce et al. |
| 2014/0015644 A1 | 1/2014 | Amann et al. |
| 2014/0015645 A1 | 1/2014 | Stiemer et al. |
| 2014/0022058 A1 | 1/2014 | Stiemer et al. |
| 2014/0062663 A1 | 3/2014 | Bourilkov et al. |
| 2014/0121473 A1* | 5/2014 | Banet ............ A61B 5/6808 600/301 |
| 2014/0121487 A1 | 5/2014 | Faybishenko et al. |
| 2014/0152442 A1 | 6/2014 | Li |
| 2014/0155850 A1 | 6/2014 | Shah et al. |
| 2014/0155851 A1 | 6/2014 | Ales et al. |
| 2014/0163502 A1 | 6/2014 | Arizti et al. |
| 2014/0188063 A1 | 7/2014 | Nhan et al. |
| 2014/0198203 A1 | 7/2014 | Vardi |
| 2014/0200538 A1 | 7/2014 | Euliano et al. |
| 2014/0241954 A1 | 8/2014 | Phillips et al. |
| 2014/0242613 A1 | 8/2014 | Takeuchi et al. |
| 2014/0242715 A1 | 8/2014 | Nhan et al. |
| 2014/0244644 A1 | 8/2014 | Maschinchi et al. |
| 2014/0266736 A1 | 9/2014 | Cretu-petra |
| 2014/0292520 A1 | 10/2014 | Carney et al. |
| 2014/0306814 A1 | 10/2014 | Ricci |
| 2014/0033442 A1 | 11/2014 | Carney |
| 2014/0329212 A1 | 11/2014 | Ruman et al. |
| 2014/0329213 A1 | 11/2014 | Ruman et al. |
| 2014/0363354 A1 | 12/2014 | Phillips et al. |
| 2014/0371702 A1 | 12/2014 | Bosae et al. |
| 2015/0025347 A1 | 1/2015 | Song |
| 2015/0042489 A1 | 2/2015 | LaVon |
| 2015/0045608 A1 | 2/2015 | Karp |
| 2015/0112202 A1 | 4/2015 | Abir |
| 2015/0130637 A1 | 5/2015 | Sengstaken, Jr. |
| 2015/0143881 A1 | 5/2015 | Raut et al. |
| 2015/0150732 A1 | 6/2015 | Abir |
| 2015/0157512 A1 | 6/2015 | Abir |
| 2015/0206151 A1 | 7/2015 | Carney et al. |
| 2015/0209193 A1 | 7/2015 | Ying et al. |
| 2015/0223755 A1 | 8/2015 | Abir |
| 2015/0276656 A1* | 10/2015 | Striemer ............ G01N 27/406 204/421 |
| 2015/0317684 A1 | 11/2015 | Abir |
| 2015/0359490 A1 | 12/2015 | Massey |
| 2016/0008182 A1 | 1/2016 | Prokopuk et al. |
| 2016/0051416 A1 | 2/2016 | Vartiainen et al. |
| 2016/0051417 A1 | 2/2016 | Chu |
| 2016/0067113 A1 | 3/2016 | Vartiainen et al. |
| 2016/0078716 A1 | 3/2016 | Olafsson-Ranta et al. |
| 2016/0080841 A1 | 3/2016 | Bergstrom et al. |
| 2016/0113822 A1 | 4/2016 | Vartiainen et al. |
| 2016/0134497 A1 | 5/2016 | Hermansson et al. |
| 2016/0136014 A1 | 5/2016 | Arora et al. |
| 2016/0170776 A1 | 6/2016 | Bergstrom et al. |
| 2016/0235603 A1 | 8/2016 | Ehmsperger et al. |
| 2016/0287073 A1* | 10/2016 | Pradeep ............ A61B 5/6801 |
| 2016/0292986 A1 | 10/2016 | Pradeep |
| 2016/0293042 A1* | 10/2016 | Pradeep ............ G06F 16/2358 |
| 2016/0345914 A1 | 12/2016 | Jain |
| 2016/0374868 A1 | 12/2016 | Ettrup Hansen |
| 2017/0035622 A1 | 2/2017 | Wang |
| 2017/0108236 A1 | 4/2017 | Guan |
| 2017/0116484 A1* | 4/2017 | Johnson ............ A61B 5/0002 |
| 2017/0156594 A1* | 6/2017 | Stivoric ............ A61B 5/6833 |
| 2017/0224543 A1 | 8/2017 | Lavon |
| 2017/0224551 A1 | 8/2017 | Lavon |
| 2017/0252225 A1* | 9/2017 | Arizti ............ A61F 13/49 |
| 2017/0278373 A1 | 9/2017 | Ansley |
| 2017/0286977 A1 | 10/2017 | Allen |
| 2018/0053396 A1 | 2/2018 | Greene |
| 2018/0096290 A1 | 4/2018 | Awad |
| 2018/0104114 A1 | 4/2018 | Pepin |
| 2018/0149635 A1 | 5/2018 | Abir |
| 2018/0204256 A1 | 7/2018 | Bifolco |
| 2019/0180341 A1 | 6/2019 | Matra |
| 2019/0336353 A1 | 11/2019 | Arizti |
| 2020/0046574 A1 | 2/2020 | Arizti |
| 2020/0060885 A1 | 2/2020 | Arizti |
| 2020/0060886 A1 | 2/2020 | Arizti |

FOREIGN PATENT DOCUMENTS

| | | |
|---|---|---|
| CN | 203950108 U | 11/2014 |
| CN | 104349040 A | 2/2015 |
| CN | 205123860 U | 3/2016 |
| CN | 105704451 A | 6/2016 |
| CN | 106210543 A | 12/2016 |
| CN | 106725506 A | 5/2017 |
| CN | 206478417 U | 9/2017 |
| CN | 207008159 U | 2/2018 |
| EP | 0149880 | 5/1984 |
| EP | 1216673 | 10/2005 |
| EP | 1542635 | 4/2012 |
| EP | 249899 | 7/2014 |
| GB | 2549099 A | 10/2017 |
| JP | 09187431 | 7/1997 |
| JP | 2002022687 | 1/2002 |
| JP | 2002143199 | 5/2002 |
| JP | 2003190209 | 7/2003 |
| JP | 2004230135 | 8/2004 |
| JP | 2006296566 | 11/2006 |
| WO | WO 95016746 | 6/1995 |
| WO | WO 99034841 | 7/1999 |
| WO | 0197466 A1 | 12/2001 |
| WO | 2005011491 A1 | 2/2005 |
| WO | WO 2010123364 | 10/2010 |
| WO | WO 2010123425 | 10/2010 |
| WO | WO 2011013874 | 2/2011 |
| WO | WO 2012084925 | 6/2012 |
| WO | WO 2012126507 | 9/2012 |
| WO | WO 2013003905 | 1/2013 |

(56) References Cited

FOREIGN PATENT DOCUMENTS

| | | |
|---|---|---|
| WO | WO 2013016765 | 2/2013 |
| WO | WO 2013061963 | 5/2013 |
| WO | WO 2013091707 | 6/2013 |
| WO | WO 2013091728 | 6/2013 |
| WO | WO 2013095222 | 6/2013 |
| WO | WO 2013095226 | 6/2013 |
| WO | WO 2013095230 | 6/2013 |
| WO | WO 2013095231 | 6/2013 |
| WO | WO 2013097899 | 7/2013 |
| WO | WO 2013181436 | 12/2013 |
| WO | WO 2013185419 | 12/2013 |
| WO | WO 2013189284 | 12/2013 |
| WO | WO 2014035302 | 3/2014 |
| WO | WO 2014035340 | 3/2014 |
| WO | WO 2014122169 | 8/2014 |
| WO | WO 2014137671 | 9/2014 |
| WO | WO 2014146693 | 9/2014 |
| WO | WO 2014146694 | 9/2014 |
| WO | WO 2014148957 | 9/2014 |
| WO | WO 2014177200 | 11/2014 |
| WO | WO 2014177203 | 11/2014 |
| WO | WO 2014177204 | 11/2014 |
| WO | WO 2014177205 | 11/2014 |
| WO | WO 2014178763 | 11/2014 |
| WO | WO 2014192978 | 12/2014 |
| WO | WO 2015003712 | 1/2015 |
| WO | WO 2015068124 | 5/2015 |
| WO | WO 2015102084 | 7/2015 |
| WO | WO 2015102085 | 7/2015 |
| WO | WO 2015/127062 A1 | 8/2015 |
| WO | 2016164373 A1 | 10/2016 |
| WO | 2017217859 A1 | 12/2017 |
| WO | WO 2018/216848 A1 | 11/2018 |

OTHER PUBLICATIONS

All Office Actions, U.S. Appl. No. 16/402,348.
All Office Actions, U.S. Appl. No. 16/452,693.
All Office Actions, U.S. Appl. No. 16/452,712.
All Office Actions, U.S. Appl. No. 16/452,726.
Http://www.goodmonit.com/.
Https://techcrunch.com/2017/04/30/monit/ (May 1, 2017).
PCT Search Report, PCT/US2019/030302, dated Aug. 16, 2019, 14 pages.
All Office Actions, U.S. Appl. No. 17/220,356.
Unpublished U.S. Appl. No. 17/220,356, filed Apr. 1, 2021, to Blanca Arizti et al.
U.S. Appl. No. 16/402,348, filed May 3, 2019, Arizti, et al.

* cited by examiner

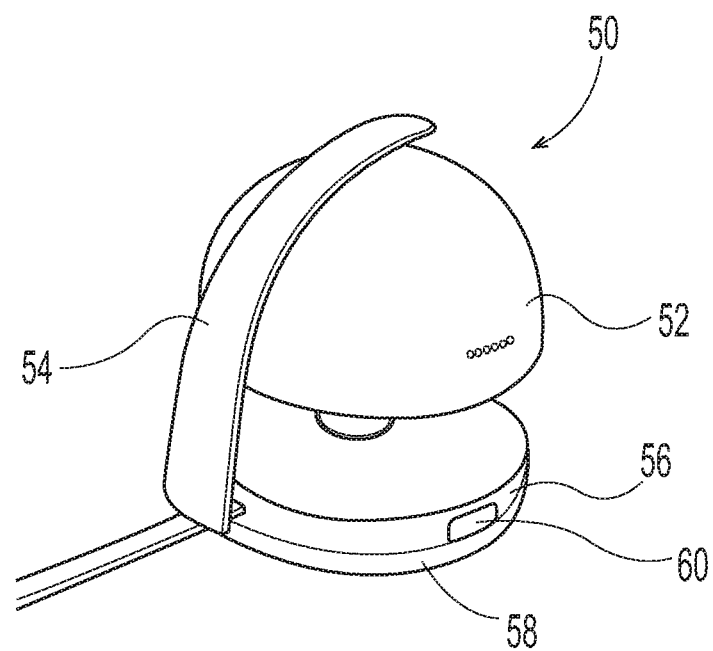
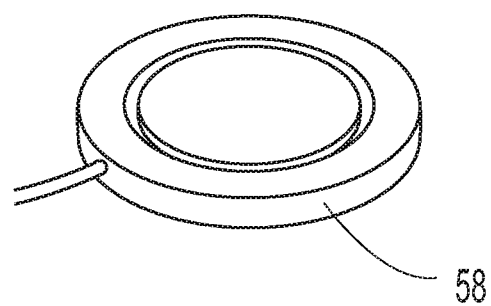
Fig. 5

MONITORING SYSTEM FOR PROVIDING BOTH VISUAL AND NON-VISUAL DATA

FIELD OF THE DISCLOSURE

The present disclosure relates to systems that include both visual and non-visual data to monitor the well-being of individuals, such as infants and patients.

BACKGROUND

Smart devices and systems for monitoring the care of infants, ageing adults, and patients are becoming commonplace. Camera and audio based baby monitors can be used to determine if an infant is sleeping or awake, content or upset, and the general nature of the infant via visual observation. However these monitors generally do not yield quantitative data regarding sleep, activity level and patterns thereof. Other monitoring devices associated with a diaper, such as those described in U.S. Pat. No. 8,628,506, can be used to determine the location, body position, and physical activity of the diaper wearer. In addition to the '506 patent being silent regarding a camera, a skilled artisan reviewing this patent can likely conclude visual data is unneeded with the scope of non-visual data available by the disclosed devices. However, a caregiver, particularly a parent of an infant, can have an emotional need to be able to see his/her infant with their own eyes and/or hear the infant with their own ears even if a device associated with the infant's diaper or clothing provides non-visual data in all of the categories the parent is interested in.

Monitoring systems of the present disclosure have the capability to provide both visual and non-visual data about the nature of a monitored individual.

SUMMARY

Monitoring systems of the present disclosure have the capability to provide visual and non-visual data about the nature of a monitored individual. Exemplary monitoring systems can comprise a wearable sensor device to generate non-visual data and a camera device to generate visual data. The wearable sensor device can be associated with a disposable absorbent article or clothing that is worn by an infant or patient being monitored.

In accordance with one form, a monitoring system is provided comprising a first monitoring device capable of providing non-visual data regarding sleep or motion-related characteristics of a monitored individual; a second monitoring device capable of providing visual data regarding sleep or motion-related characteristics of the monitored individual; and a software application for displaying both the non-visual data or aspects thereof, and the visual data or aspects thereof, to a caregiver of the monitored individual.

In accordance with another form, a monitoring system is provided comprising a multi-use wearable sensor device for temporary association with an absorbent article, and a camera device capable of capturing visual information regarding the monitored individual. The multi-use wearable sensor device comprises a first sensor capable of capturing non-visual data/information regarding a monitored individual and a second sensor capable of capturing a condition of the absorbent article.

BRIEF DESCRIPTION OF THE DRAWINGS

The above-mentioned and other features and advantages of the present disclosure, and the manner of attaining them, will become more apparent and the disclosure itself will be better understood by reference to the following description of example forms of the disclosure taken in conjunction with the accompanying drawings, wherein:

FIG. 1 also shows a peripheral device that can be used to display and monitor data and other information collected by the wearable sensor device and/or camera device.

FIG. 5 is a perspective view of an exemplary camera device that is attached to a first docking station along with a second docking station for placement in a second location.

DETAILED DESCRIPTION

Various non-limiting aspects of the present disclosure will now be described to provide an overall understanding of the principles of the structure, function, manufacture, and/or use of the subject matter disclosed herein. In the following detailed description, reference is made to the accompanying figures, which form a part hereof. In the figures, similar symbols can identify similar elements, unless context dictates otherwise. It will be readily understood that the aspects of the present disclosure, as generally described herein, and illustrated in the figures, can be arranged, substituted, combined, separated, and designed in a wide variety of different configurations.

Figure 1:
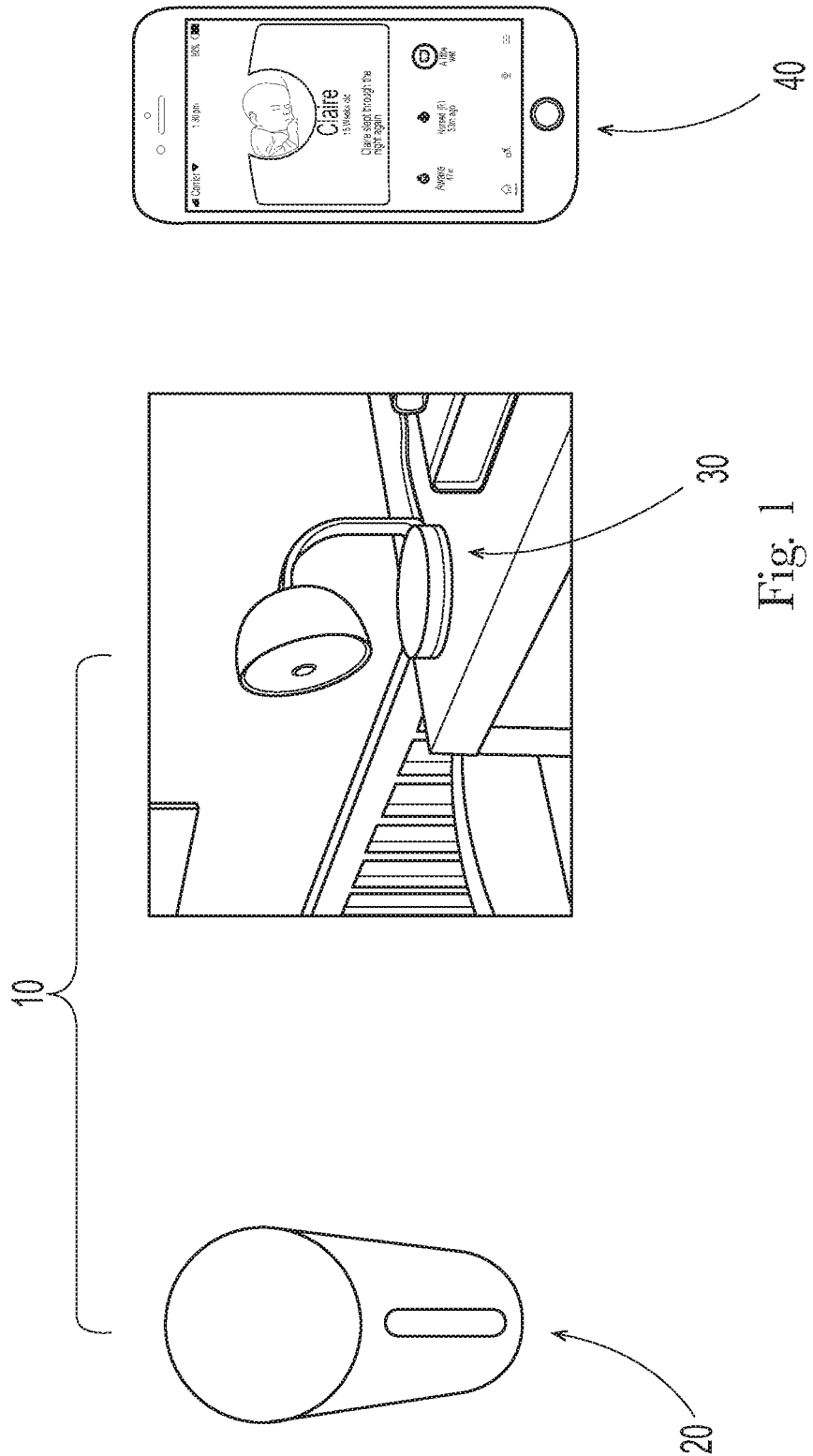
FIG. 1 is a schematic showing an exemplary monitoring system comprising a wearable sensor device and a camera device.
Figure 2:
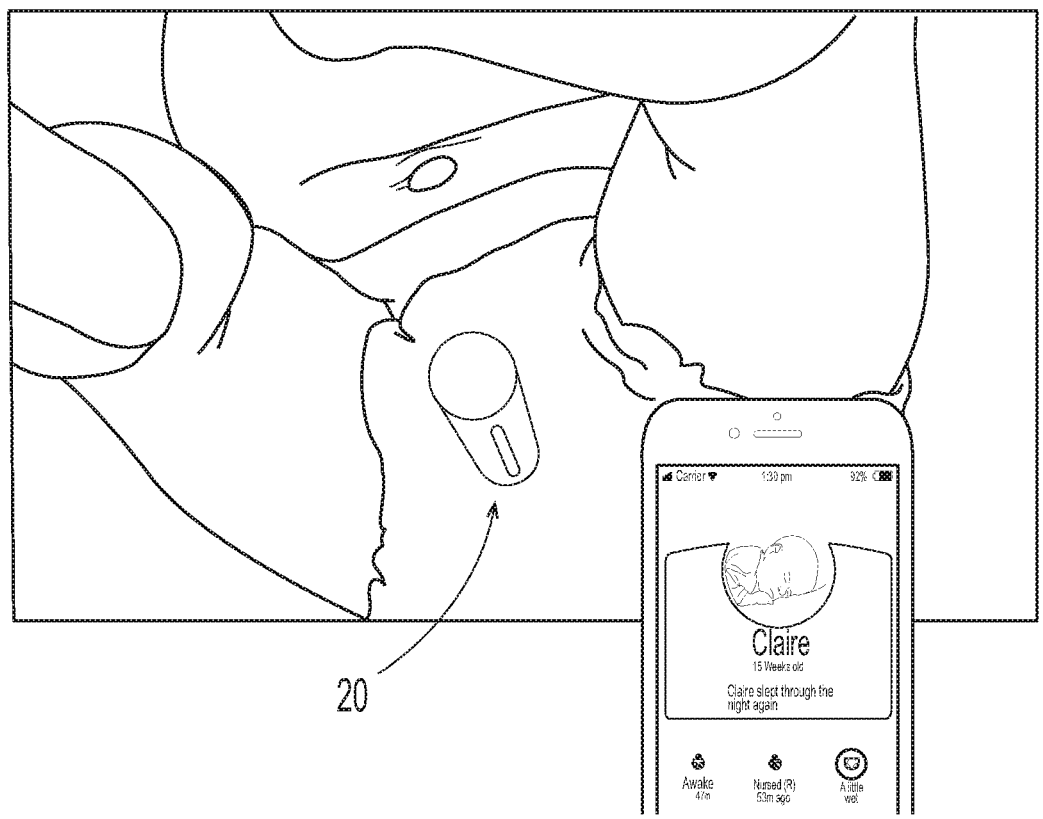
FIG. 2 is a schematic showing a wearable sensor device attached to an exterior of a diaper.

Monitoring systems of the present disclosure have the capability to provide both visual and non-visual data about the nature of a monitored individual. With reference to FIG. 1, an exemplary monitoring system 10 is shown that comprises a wearable sensor device 20 to generate non-visual data and a camera device 30 to generate visual data and optionally audio. Wearable sensor device 20 can be associated with a disposable absorbent article (see, e.g., FIG. 2) or clothing that is worn by an infant or patient being monitored. Wearable sensor device 20 can be a single-use sensor or a multi-use sensor that can be removed from clothing or a soiled disposable absorbent article and associated with a freshly-donned article. A multi-component wearable sensor device is also contemplated, wherein a first sensor component (e.g., capacitor) forms a part of the manufactured article and a second, multi-use sensor component (e.g., power source and data transmitter) connects with the first sensor component to create sensor functionality.

A peripheral device 40 in the form of a smart phone is shown in FIG. 1, as an example of a device that can be used by a caregiver to observe and manage the non-visual and/or visual data or aspects thereof that are provided by monitoring systems of the present disclosure. The non-visual data transmitted from wearable sensor device 20 can be communicated to camera device 30 and thereafter communicated to a peripheral device, or alternatively, be communicated to the peripheral device bypassing camera device 30. Camera device 30 can also be configured to communicate non-visual data from wearable sensor device 20 in the absence of communicating visual data obtained by camera device 30.

Figure 3:
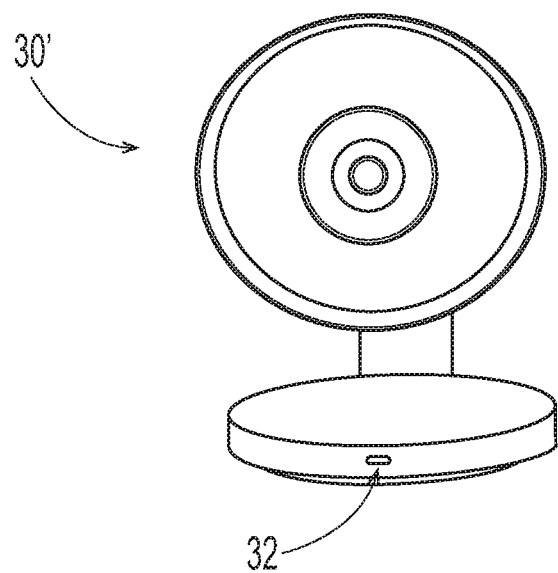
FIG. 3 is a front view of an exemplary camera device suitable for use in monitoring systems provided herein.

Monitoring systems of the present disclosure can optionally include additional sensors beyond wearable sensor device 20. For example, an environmental sensor to measure environmental conditions where an infant or patient is located can be used. A list of non-limiting environmental sensors includes a temperature sensor, a relative humidity sensor, a carbon monoxide sensor, a VOC (volatile organic compound) sensor, a smoke sensor, a motion sensor, and combinations thereof. These additional sensors can be separate from wearable sensor device 20 and camera device 30, or alternately be incorporated with one or both of them. By way of example only, FIG. 3 shows a camera device 30' that includes a sensor port 32 that allows a temperature sensor and/or relative humidity sensor disposed within camera device 30' to measure such environmental conditions.

Figure 4:
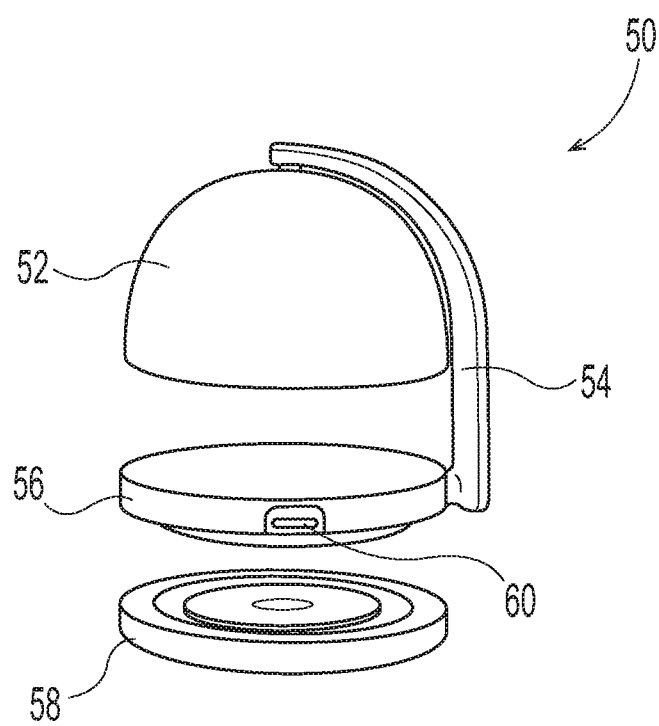
FIG. 4 is side view of an exemplary camera device that includes a camera and a camera docking station.

Camera devices forming part of the disclosed monitoring systems can take many forms and can include various functionality, including an ability to capture video and still visual images, contain night vision technology to capture visual images in a dark or semi-dark environment, contain noise and/or motion activation features, and ability to transmit current and historical visual information. An exemplary camera device 50, shown in FIGS. 4 and 5, includes a camera head 52 pivotally connected to an arm 54 that is attached to a support member in the form of a base 56. Support members of suitable camera devices can take many forms and can include a variety of features for securing the camera device to its intended structure or location. Having a pivotable or otherwise moveable camera head can provide numerous benefits, including, for example, being able to capture visual data from different fields of view without moving the camera base position. In some forms, the gap between camera head 52 and arm 54 or base 56 can be between about 3 mm and 16.5 mm to help mitigate pinching and entrapment. As can be seen in FIG. 4, camera head 52 can also pivot downward to face base 56 for privacy and to prevent capturing unintentional visual data.

Exemplary camera device 50 further includes a docking station 58 that is releasably engageable with base 56. A latch 60 is employed to positively secure base 56 to docking station 58. Other means, for example, magnets, can equally be used for making the secure connection between base 56 and docking station 58. The monitoring systems can include multiple docking stations, as shown in FIG. 5, to enable capturing visual data from multiple locations with a single camera. The multiple docking stations can be similar or dissimilar to one another. For example, one of the multiple docking stations can be configured (e.g., with brackets to secure the docking station power cord to a wall) for a more permanent location such as a nursery, while a second docking station is configured for mobility to be taken to different locations within or outside of one's home. The skilled artisan should readily appreciate that multiple standalone camera devices can be included with monitoring systems disclosed herein rather than having a single camera and multiple docking stations.

Besides optionally comprising additional sensors, the camera devices of the monitoring systems herein can include light sources and audio capability. The light sources can emit constant or changing light effects. The light source can, for example, emit light outside of the visible blue light spectrum (e.g., wavelengths in the range of 300 nm to 700 nm, or 400 nm to 500 nm). Blue light hazard function weight radiance (LB) can be less than 0.2. The audio can be one-way or two-way. The light sources can avoid blinking and flashing LEDs with frequency between 3 Hz and 60 Hz to help mitigate seizures in photosensitive individuals (both monitored individuals and caregivers). The audio capability can permit communication between a caregiver and a monitored infant or patient, including from the infant/patient to the caregiver. The audio capability can also provide caregiver communications, music or other soothing sounds.

The camera devices of the monitoring systems herein can also include a variety of safety features. A mount of the camera device and/or secure positioning within a docking station should be able to sustain certain loading before the camera device or camera within the docking station is dislodged. For example, the placed positioning can withstand three times the device or component weight applied downwardly for 1 minute and/or 50 newtons applied sideways for 1 minute (after stress relief testing) according to IEC 60065-14 wall mounting test (section 19.7). The camera device with or without a separable docking station can be sufficiently light to help mitigate harm to a monitored individual or caregiver should it accidently fall on them. Along these lines, the camera device (with or without a docking station) can weigh less than 500, 400, 300, 200, 100, or even 75 grams.

Power cords that are extremely flexible can more easily become wrapped around an undesirable object such as a monitored individual. To help prevent this, the power cord of the camera devices can have a safe release mechanism or easy cord pull (e.g., under 0.65 pound force) which can help mitigate strangulation concerns. Increasing the bending stiffness and/or its cross-sectional areas may also mitigate strangulation hazards.

The wearable sensor device can be a single-use device, or a multi-use device. The wearable sensor device can be attachable to skin (via hydrogel or bio-adhesive material, for example), to a disposable article such as an absorbent article, and/or to clothing worn by a monitored individual. Various attachment mechanisms can be employed for attaching the wearable sensor device to an article of clothing or disposable absorbent article such as a diaper, pant, pad or brief. For example, hook and loop fastening mechanisms, magnets, adhesives, thermal bonds, and male and female mating fasteners such as snaps and buttons. Receiving features, such as pockets, recesses, and voids can also be employed that essentially hold the wearable sensor device with or without attachment features. In yet another form, an auxiliary article can be used to integrate the wearable sensor device with a disposable absorbent article. The auxiliary article can be in the form of a pant-like reusable garment designed to fit over a disposable absorbent article.

In one form, the wearable sensor device is adapted for attachment to an outer cover of a disposable absorbent article. Hook and loop features can be used with this attachment approach. For example, a strip of hook material can be affixed to one surface of the sensor housing, where the hooks can engage directly with material used for the outer cover or with an added strip of "loop" material.

The wearable sensor device can include a sensor housing that generally protects sensors and other electronic components disposed therein, as well as inhibiting unwanted contact of the same with an infant, patient, or caregiver. The housing can be made from a variety of materials, both flexible and rigid, examples of which include thermoplastic polymers, thermoplastic elastomers, silicone, Tecaform, Tecanant, thermoplastic copolyester (TPC) and combinations thereof. Other materials can also be employed for the housing so long as it is generally regarded as safe for human contact and does not cause irritation or other unwanted health effects. The materials can include bio-compatible, medical grade, and non-cytotoxic materials. Inclusion of a bittering agent or other approaches can optionally be used to discourage placement of the sensor device in one's mouth or otherwise tampering with the wearable sensor device.

The wearable sensor device comprises a plurality of electronic component disposed on and/or within the housing. Typically, the electronic components include at least one sensor, a transmitter, and a power source (e.g., a disposable battery or a rechargeable battery). The number and type of sensors employed by the sensor device are chosen based on the application of the monitoring systems disclosed herein.

The monitoring systems are capable of capturing and communicating a combination of visual data and non-visual data to caregiver. With connection back to the background section above, one exemplary monitoring system of the present disclosure includes the combination of a wearable sensor device comprising a motion sensor and a camera device. The motion sensor can provide non-visual sleep-related data including, for example, time of sleep, sleep duration, sleep position, sleep position changes, and activity-related data including, for example, tummy time, level of activity, and nursing/feeding. Suitable motion sensors include accelerometers, inertial measurement units (IMUs), gyroscopes, and magnetometers. As noted in the background, notwithstanding the benefit of obtaining the non-visual sleep-related data, a caregiver wants/needs to see a monitored individual to understand visual sleep (or pre- and/or post-sleep) aspects of a monitored individual. The camera device can provide this visual confirmation desired by the caregiver. Having both data sources available additionally provides comfort to a caregiver when the camera device is unable to capture information regarding the monitored individual. For example, the camera device is powered off or the monitored individual is not within the field of view of the camera. In this scenario the wearable sensor device can provide data and information to the caregiver until the camera device is able to capture the monitored individual.

Besides obtaining sleep-related data and information, monitoring systems provided herein are capable of obtaining both visual and non-visual data and information related to other activities that contain a motion aspect, including, for example, eating, drinking, breastfeeding, walking, crawling, and tummy-time. The non-visual data and information can be determined by a wearable sensor device or a remote sensor device (unattached to a monitored individual or anything worn by the individual) that is capable of measuring motion and a camera device.

Some monitoring systems of the present disclosure can include a wearable sensor device comprising two or more sensors and a camera device. The wearable sensor device is associated with a disposable absorbent article and comprises a first sensor that is capable of capturing non-visual data and information regarding a monitored individual, and a second sensor that is capable of capturing a condition (e.g., clean or soiled with body exudates) of the disposable absorbent article. The first sensor associated with the wearable sensor device can be a motion sensor as described above for capturing information about sleep or activity aspects. The second sensor can be a wetness sensor or bowel movement (BM) sensor for detecting urine or feces within the disposable absorbent article, and/or track absorbent article usage. The wearable sensor device can include both a wetness sensor and a BM sensor in some forms. In one form, the wearable sensor device is free of audio capturing or communicating components.

Wetness sensors for detecting the presence of urine or other bodily fluid can include optical sensors, color sensors, and electrical sensors that comprise a resistance, capacitance, inductance or continuity sensitive indicator. A resistance sensitive indicator can be provided, for example, by providing two electrical conductors disposed at a given spatial distance relative to each other. A VOC sensor is one suitable type of a BM sensor. The VOC sensors can be of MOS-type (metal oxide). BM sensors can be capable of acting as an electronic nose to detect chemical signatures of organic materials associated with body exudates, including, for example, skatole, mercaptans, amines, volatile fatty acids, acetone, methyl acetate, and methanol. BM sensors can also include an optical or color sensor to detect the presence of feces in the article. Along these lines, multiple optical or color sensors can be used to detect both urine and feces, based either on their inherent colors or based on use of an indicator that changes color in the presence of urine and/or feces. For example, the following enzymes associated with body exudates can trigger an optical change in an included indicator that can be sensed by an optical or color sensor: urease, trypsin, chemotrypsin, LAP, lipase, amilase, and urease.

Figure 6:
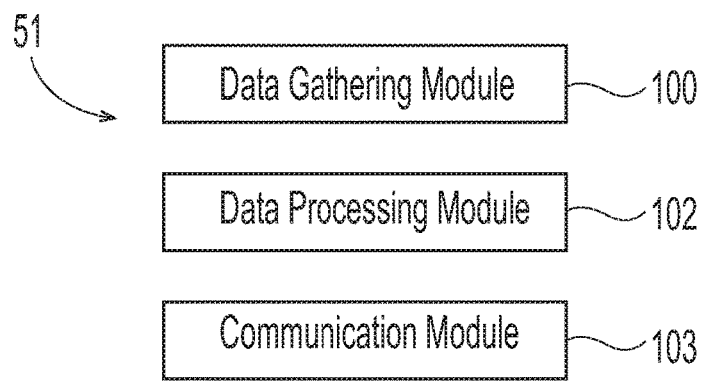
FIG. 6 is a diagram of an exemplary monitoring system comprising a data gathering module, a data processing module, and a communication module.

With reference to FIG. 6, monitoring systems S1 of the present disclosure can include three elements: a data gathering module 100, a data processing module 102, and a communication module 103. The data gathering module can include a camera device 202/205 and a wearable sensor device 200 and that can be associated with a disposable absorbent article or article of clothing worn by an infant or patient. Besides the wearable sensor device and camera device, the data gathering module can comprise other sensor devices or equipment in proximity to the person wearing the sensor device. For example, the data gathering module can comprise an environmental sensor for sensing smoke, carbon monoxide, VOC's, temperature, relative humidity; a motion sensor, an audio recorder, and the like.

The data processing module can comprise data transmission, data storage, data interpretation, and/or data manipulation to transform the data from the data gathering module into consumer understandable information related to the wellbeing of an individual, including, for example, feeding, sleeping, and/or voiding. And the communication module comprises a software application for communicating (e.g., displaying) the data and information from the wearable sensor device and the camera device.

Figure 7:
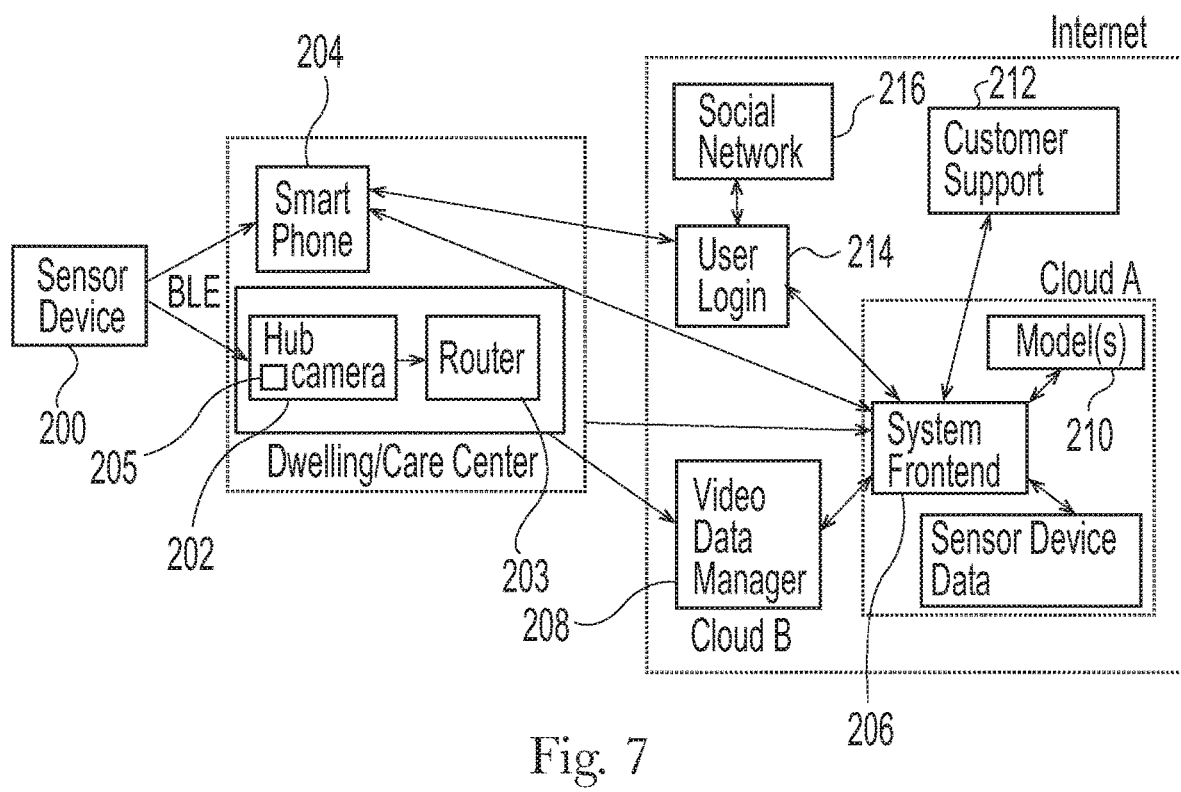
FIG. 7 is a flow diagram showing one operational scheme for monitoring systems of the present disclosure.

FIG. 7 is an exemplary schematic illustrating how monitoring systems of the present disclosure can operate. Two example operation modes are shown; one where the wearable sensor device 200 is worn by an infant/patient that is located within a dwelling or care center 202 with wireless communication (e.g., Bluetooth low energy, 15.4, ad hoc mesh networks, and the like) conducted between wearable sensor device 200 and a hub 202 comprising a camera device 205. And another where the infant/patient is located remotely (e.g., in a car or stroller) with wireless communication conducted between wearable sensor device 200 and a smart peripheral device 204 (e.g., phone). Data and information from wearable sensor device 200 is communicated via a router 203 or smart device 204 to a system frontend 206 for transforming the data and information to consumer usable information provided via a software application.

Figure 8:
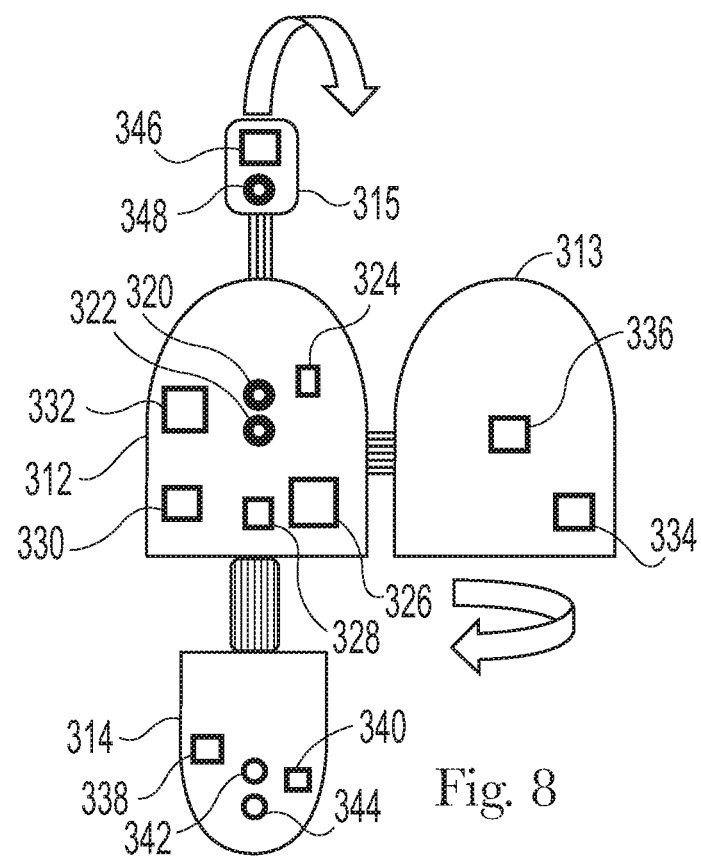
FIG. 8 is a partial view of an exemplary wearable sensor device of the present disclosure.
Figure 9:
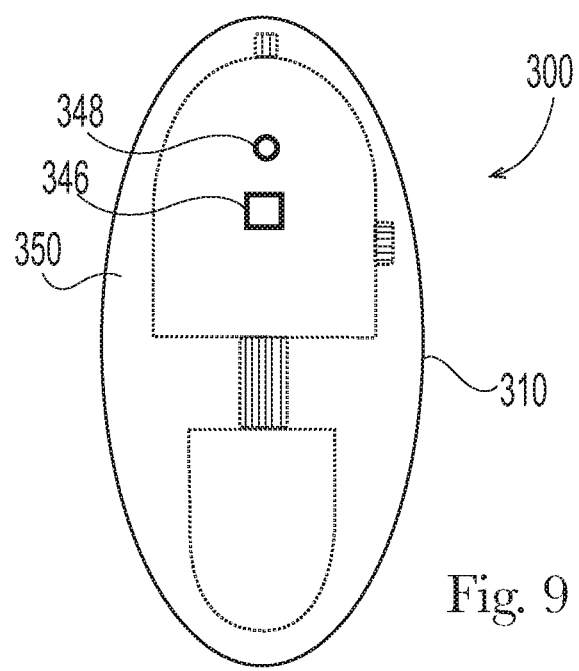
FIG. 9 is a caregiver-facing side of a wearable sensor device of the present disclosure.

FIGS. 8 and 9 illustrate aspects of one exemplary wearable sensor device 300 comprising a plurality of sensors and other electronic components. FIG. 8 shows the wearable sensor device in a manufactured form before its final configuration and encasing with a sensor housing 310 (shown in FIG. 10). With reference to FIG. 8, multiple electrically-connected printed circuit boards 312, 313, 314, and 315 are employed. Printed circuit board 312 comprises an optical sensor 320, an absorbent article-facing light source 322, a power management component 324, a flash memory component 326, an optical sensor frontend 328, a processor and transmitter component 330, and an antenna 332. Printed circuit board 313 comprises a motion sensor (e.g., accelerometer) 334 and a power source (e.g., coin cell battery) 336. Printed circuit board 314 comprises a BM sensor (e.g., VOC sensor) 338, a temperature and relative humidity sensor 340, a second optical sensor 342, and a second absorbent article-facing light source 344. And printed circuit board 315 comprises a consumer-engageable button 346 for activating or otherwise operating sensor device 300, and a caregiver-facing light source 348 to indicate an operational aspect of sensor device 300. Button 346 or similar engageable feature can be used for multiple tasks. For example, button 346 can be initially activated for "waking" the wearable sensor device up from a power-save mode and/or manually activated by a caregiver upon changing an absorbent article if a wearer of the article has had a bowel movement. Acknowledgement of a bowel movement via action of button 346 or similar engageable feature can be communicated by the wearable sensor device to a communication module for tracking timing, frequency, or other aspects of a wearer's bowel movement history. One skilled in the art would appreciate that a single circuit board can be employed in a sensor device, as well as other numbers of circuit boards beyond what is shown in FIG. 8.

In one form, the wearable sensor device comprises a power source in the form of a battery, a transmitter, multiple optical sensors (e.g., a color sensor), multiple light sources (e.g., an LED), and an accelerometer. The wearable sensor device is attached to an absorbent article comprising a wetness indicator, as described above, such that the light source can direct light onto the wetness indicator. The wetness indicator changes appearance (e.g., changes color) when a wearer urinates into the absorbent article. The optical sensor measures the reflected light from the wetness indicator to sense when a urination event occurs. Multiple pairs of absorbent article-facing light sources and optical sensors can be employed to sense changes of a wetness indicator at different points along the indicator to confirm a urination event has occurred, or predict the volume of urine and/or number of urination events that occurred. A signal from the optical sensor can then be transmitted to the data processing module. The accelerometer is employed to track data associated with sleep and awake times. The awake data can include awake feeding motion data and awake non-feeding motion. The accelerometer is capable of sensing breastfeeding times and provide feeding information for one's right breast and left breast. The accelerometer can also be configured to sense bottle feeding aspects.

The data processing module can comprise data transmission, data storage, data interpretation, data filtering, and/or data manipulation to transform the data from the data gathering module into consumer understandable information related to the wellbeing of an individual, including, for example, feeding, sleeping, and/or voiding. The data processing module can include algorithms to parse/filter the received data. Data processing can be accomplished by one or more devices and in the same or different locations. For example, the wearable sensor device can optionally employ a memory device to temporarily store data. One reason for temporary storage of data is when communication between the wearable sensor device and a remote data processing module component and/or the information communication module is unavailable.

The wearable sensor device can also optionally employ a data processor for processing raw data from one or more sensors associated with the wearable sensor device prior to transmitting data/information based on the raw data. This can reduce the volume of data/information transmitted from the wearable sensor device, and thereby reduce the amount of power required and accompanying electromagnetic radiation emission.

The communication module comprises a software application operable on a computer device to display information related to the data obtained by the data gathering module, including data transformed via the data processing module. The computer device can be a smart phone, as is shown in FIG. 1, but other computer devices, such as a laptop, tablet, digital assistant (ALEXA and GOOGLE HOME, for example) can be used to communicate information to one or more caregivers. Monitoring systems of the present disclosure can provide both visual and non-visual data and information regarding a monitored individual. Software applications are typically employed to display and otherwise communicate this data and information. While separate software applications can be employed to view and/or manage the visual and non-visual components, respectively, it is preferred for a single software application to be utilized to both provide visual data of the monitored individual and provide the non-visual data and information arising from a wearable sensor device and a camera device. Data and information from the wearable sensor device and/or camera device can be encrypted in the event someone other than the caregiver gains access to the data and information.

Wearable sensor devices and monitoring systems including the same can form a part of consumer purchasable kit. One exemplary kit includes two or more wearable sensor devices as described herein, a camera device, a plurality of absorbent articles that can accept the wearable sensor devices, and access to a software application for viewing data and information flowing from the wearable sensor device and camera device. A subscription can be offered to consumers that provides delivery of additional absorbent articles, wearable sensor devices, and/or continued access and operation of the software application. For example, a subscription can include an automatic delivery of a number of absorbent articles every two weeks along with a code or other mechanism for continued operation of the software application. The subscription can work with an affirmative action request by a consumer or as an automatic delivery order that delivers products on a set re-occurring schedule until the schedule reaches a predetermined endpoint, or is altered or discontinued by the consumer. Similar to the subscription example above, packages of absorbent articles can be sold in brick and mortar locations wherein the packages contain a code for operation of the software application to view data and information received from a wearable sensor device according to the present disclosure.

Figure 10:
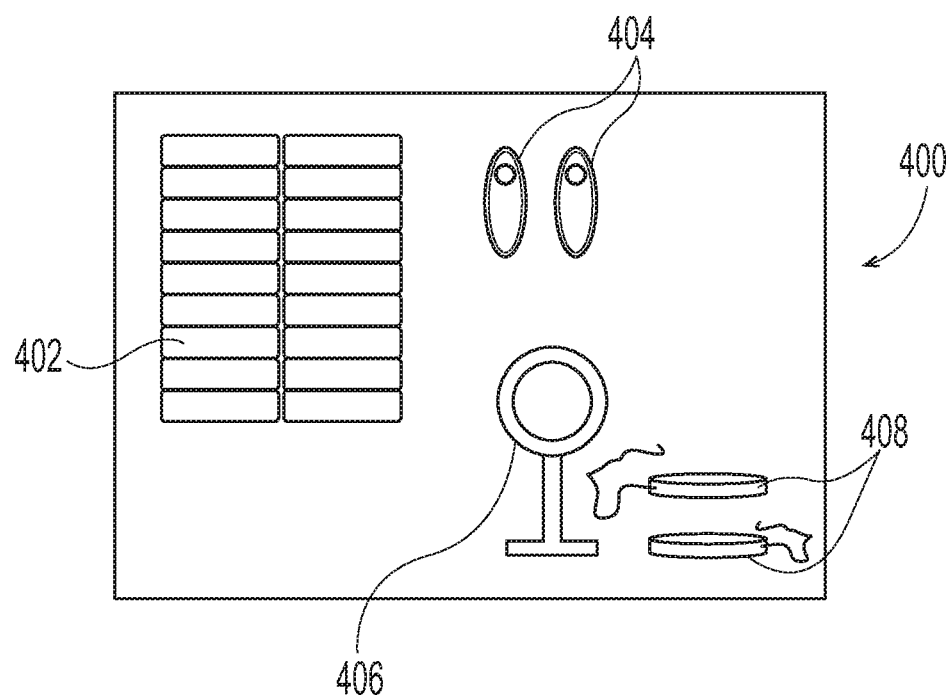
FIG. 10 is an exemplary kit of the present disclosure, comprising a plurality of disposable absorbent articles, two wearable sensor devices, a camera, and two camera docking stations.

FIG. 10 shows an exemplary kit 400 comprising a plurality of absorbent articles 402, two wearable sensor devices 404, a camera 406, and two camera docking stations 408.

While the discussion has focused on infants and patients, systems of the present invention are also applicable for elderly care. The sensors associated with such systems can be capable of association with an elderly's skin, durable undergarments, disposable absorbent articles, bed materials, bed pads, and/or clothing articles.

This application claims the benefit of U.S. Provisional Application No. 62/773,401, filed on Nov. 30, 2018, 62/723,179, filed on Aug. 27, 2018 and 62/666,989, filed on May 4, 2018, the entireties of which are all incorporated by reference herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure disclosed or claimed herein or that it alone, or in any combination with any other reference or references, teaches, suggests or discloses any such disclosure. Further, to the extent that any meaning or definition of a term in this document conflicts with any meaning or definition of the same term in a document incorporated by reference, the meaning or definition assigned to that term in this document shall govern.

While particular forms of the present disclosure have been illustrated and described, it would be obvious to those skilled in the art that various other changes and modifications can be made without departing from the spirit and scope of the disclosure. It should be understood that other forms can include more or less of each element shown in a given figure. Further, some of the illustrated elements can be combined or omitted. Yet further, an exemplary form can include elements that are not illustrated in the figures. The various aspects and forms disclosed herein are for purposes of illustration and are not intended to be limiting, with the true scope and spirit being indicated by the following claims.

What is claimed is:

1. A monitoring system, comprising:
   a. a first camera device or camera device component for enabling visual data feed from a first location;
   b. a second camera device or camera device component for enabling visual data feed from a second location; and
   c. a wearable sensor device,
   wherein at least one of the first or the second camera device or camera device component comprises one or more environmental sensors, the one or more environmental sensors comprising a temperature sensor and a relative humidity sensor.

2. The monitoring system of claim 1, wherein the first camera device or camera device component comprises a camera, and the second camera device or camera component comprises a docking station capable of releasable engagement with the camera.

3. The monitoring system of claim 1, wherein the first camera device or camera device component comprises a first docking station for releasable engagement with a camera, and the second camera device or camera component comprises a second docking station capable of releasable engagement with the camera.

4. The monitoring system of claim 1, wherein the first camera device or camera device component comprises a first standalone camera, and the second camera device or camera component comprises a second standalone camera.

5. The monitoring system of claim 1, wherein the wearable sensor device comprises an accelerometer.

6. The monitoring system of claim 1, wherein the wearable sensor device comprises a wetness sensor.

7. A method for monitoring an individual, the method comprising:
   a. obtaining visual data of a monitored individual from a first camera device at a first location;
   b. obtaining visual data of the monitored individual from a second camera device at a second location; and
   c. obtaining non-audiovisual data of the monitored individual from a wearable sensor device associated with an absorbent article worn by the monitored individual;
   wherein at least one of the first camera device or the second camera device comprises one or more environmental sensors, the one or more environmental sensors comprising a temperature sensor and a relative humidity sensor.

8. The method of claim 7, further comprising obtaining audio from the monitored individual via at least one of the first or the second camera device.

9. The method of claim 7, further comprising timewise aligning the obtained visual data and the obtained non-audiovisual data.

10. The method of claim 7, further comprising:
    d. assigning a first timestamp to the obtained visual data;
    e. assigning a second timestamp to the obtained non-audiovisual data; and
    f. correlating the first timestamp and the second timestamp.

11. The method of claim 7, further comprising displaying at least some of the visual data from at least one of the first or the second camera device simultaneously with at least some of the non-audiovisual data to a caregiver of the monitored individual.

* * * * *